Figure 1:
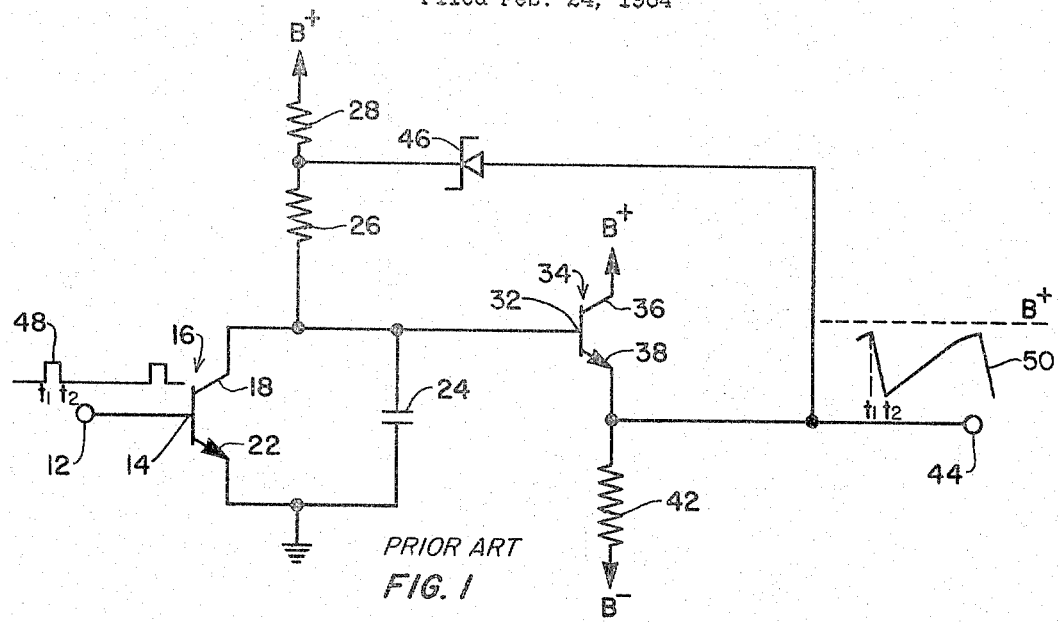

Jan. 31, 1967

HUGH L. DRYDEN
DEPUTY ADMINISTRATOR OF THE NATIONAL
AERONAUTICS AND SPACE ADMINISTRATION
LINEAR SAWTOOTH VOLTAGE-WAVE GENERATOR EMPLOYING TRANSISTOR
TIMING CIRCUIT HAVING CAPACITOR-ZENER DIODE
COMBINATION FEEDBACK
Filed Feb. 24, 1964

3,302,040

INVENTORS
Elberson D. Green
Martin G. Woolfson
BY
ATTORNEYS

United States Patent Office 3,302,040
Patented Jan. 31, 1967

3,302,040
LINEAR SAWTOOTH VOLTAGE-WAVE GENERATOR EMPLOYING TRANSISTOR TIMING CIRCUIT HAVING CAPACITOR-ZENER DIODE COMBINATION FEEDBACK
Hugh L. Dryden, Deputy Administrator of the National Aeronautics and Space Administration with respect to an invention of Elberson D. Green and Martin G. Woolfson
Filed Feb. 24, 1964, Ser. No. 347,101
2 Claims. (Cl. 307—88.5)

This invention relates in general to electric wave generators and more particularly to an improved generator for providing a linear sawtooth voltage wave shape.

In high precision sweep or delay circuits, the slight exponential curvature of a sawtooth voltage waveform is highly undesirable and methods of compensation must be employed to produce the necessary degree of linearity. The most direct method of producing a linear sawtooth voltage is by increasing the source of potential used to charge a capacitor so that during the time the capacitor is charged it will charge linearly. However, there is a definite practical limit to the magnitude of the source of potential. Further, if transistors are to be used in the circuit, high voltages become extremely impractical.

A more satisfactory manner to produce a linear sawtooth voltage would be to charge the capacitor from a constant current source. One method of obtaining a constant current is by use of a feedback circuit commonly called a "bootstrap sweep circuit." In one such bootstrap sweep circuit the desired constant current source is obtained by using a capacitor in the feedback path. However, the feedback capacitor will discharge and thereby prevent a constant voltage from being maintained across the charging resistor during the charging time. The sawtooth voltage obtained by this method will be nonlinear.

Another method of obtaining a sawtooth voltage utilizing a bootstrap sweep circuit would be by use of a zener diode in the feedback path. The charging current in such a circuit is equal to the zener voltage divided by the charging resistance and is substantially constant. However, the theoretical maximum sweep voltage for the bootstrap sweep circuit is the value of the source of potential. Another drawback to the latter-mentioned circuit is that the current through the zener diode is a function of the sweep voltage so that the voltage across the zener diode changes due to its finite resistance.

In order to overcome the attendant disadvantages in the prior art sweep circuits, the sweep circuit of the present invention utilizes a pair of feedback loops. The first loop contains a zener diode which maintains a relatively constant charging current. The second loop contains a capacitor which allows the zener diode current to remain relatively constant during the generation of the sweep voltage while further allowing a charging capacitor to charge to a relatively high voltage level.

More particularly, the circuit comprises an input terminal for applying a source of pulses to the base of a switching transistor. A charging capacitor is connected across the collector-emitter circuit of the transistor. The emitter of the transistor is grounded and the collector is connected to one side of a charging resistor. The side of the charging capacitor connected to the collector is also connected to the base of a second transistor connected in emitter-follower fashion. The collector of the second transistor is connected to a source of positive potential, whereas the emitter is connected to a source of negative potential through a resistor. The output terminal of the circuit is connected to the emitter of the second transistor. An anode of a zener diode is also connected to the second transistor emitter and the cathode of the zener diode is connected to the other side of the charging resistor. Also connected to the emitter in a second feedback path is a capacitor, the other side of which is connected to a current limiting resistor. The current limiting resistor has its other side connected to the cathode of the zener diode. Further, the junction of the feedback capacitor and current limiting resistor is connected to a source of positive potential through a diode. The resultant combination of two feedback paths results in a substantially linear output sawtooth voltage.

Figure 2:
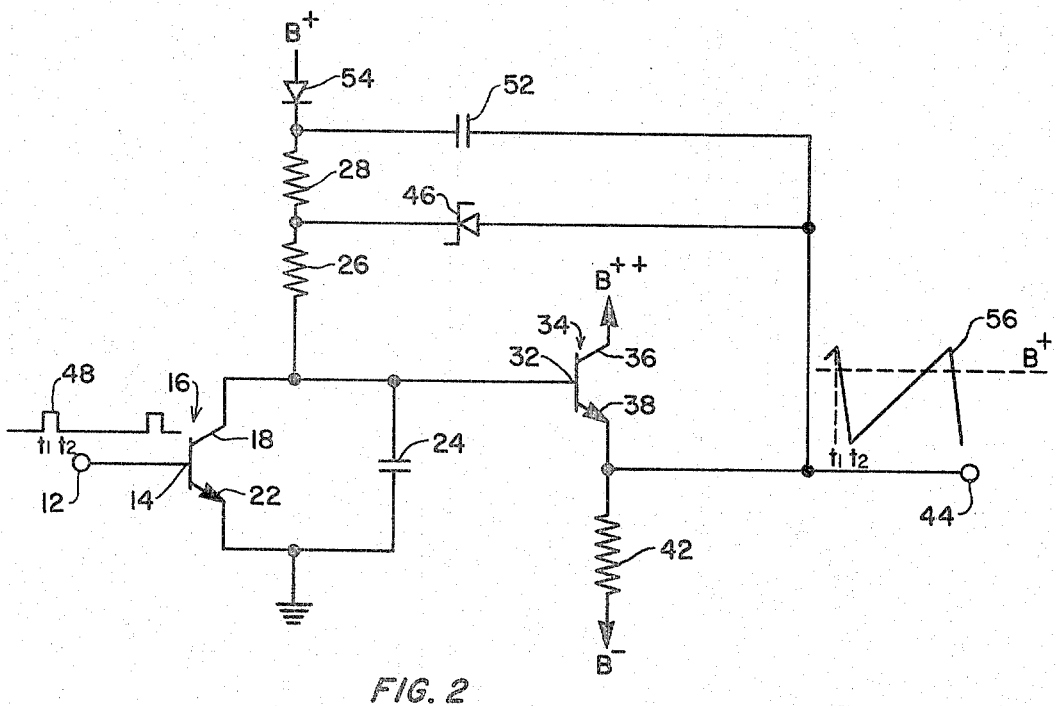

The advantages of this invention, both as to its construction and mode of operation, will be readily appreciated as the same become better understood by reference to the following detailed description when considered in connection with the accompanying drawings in which like referenced numerals designate like parts through the figures, and wherein:

FIG. 1 is a circuit diagram of a presently known wave shape generator which is shown to assist in an understanding of the invention, and FIG. 2 is a circuit diagram of the novel wave shape generator in accordance with this invention.

Referring now to the drawings, there is shown in FIG. 1 a well-known transistorized waveshape generator for generating a sawtooth voltage. A source of pulses are applied to an input terminal 12 connected to the base 14 of a switching transistor 16. Connected across the collector 18 and emitter 22 of the transistor 16 is a charging capacitor 24. One side of the charging capacitor is connected to a source of reference potential and the other side is connected to a charging resistor 26. The charging resistor 26 is connected to a source of positive potential through a current limiting resistor 28.

The collector 18 is also connected to the base 32 of a second transistor 34. The collector 36 of the second transistor 34 is connected to a source of positive potential, and the emitter 38 is connected to a source of negative potential through a current limiting resistor 42. Output signals are taken from a terminal 44 connected to the emitter 38. Further, a feedback path containing a zener diode 46 has its anode connected to the emitter 38 and its cathode connected to the junction of the charging resistor 26 and the current limiting resistor 28. The arrangement for the transistor 34 will be readily recognized as an emitter-follower circuit.

At time $t_1$, when a pulse 48 is applied to the base 14, the transistor 16 is rendered conductive, thereby causing the capacitor 24 to discharge. At time $t_2$, when the transistor is again rendered nonconductive, the capacitor 24 begins to charge through the charging resistor 26 and resistor 28 towards a value approaching B+. Further, due to the emitter-follower arrangement of the transistor 34, the output voltage 50 appearing at the output terminal 44 will approach the voltage across the capacitor 24.

The output voltage 50 appearing at terminal 44 is also fed back to the junction of the resistors 26 and 28 through the zener diode 46, so that the voltage across the resistor 26 tends to remain constant. Thus, the net result is a substantially constant voltage across the resistor 26 resulting in a constant charging current to the capacitor 24.

The circuit of FIG. 1, however, has two drawbacks. First, the peak sweep voltage is limited to a theoretical maximum value of $E_p$, where $$E_p = B^+ - (E_z + iR_{28})$$

where $E_z$ = the voltage drop across the diode 46, and $iR_{28}$ is equal to the voltage drop across the resistor 28. At the maximum sweep voltage the current through the zener diode will reduce to zero and the zener diode cuts off.

The second drawback to the circuit of FIG. 1 is that since the current through the zener diode is a function of the sweep voltage, the voltage across the zener diode will vary to a limited extent due to its finite resistance $R_z$, thus preventing the voltage across the resistor 26 from remaining constant.

In order to overcome the drawbacks of the circuit of FIG. 1 there is shown a modified version thereof in FIG. 2. A second bootstrap feedback circuit containing a capacitor 52 is connected between the emitter 38 and resistor 28. Connected to the junction of the resistor 28 and capacitor 52 is a diode 54 having its anode connected to a first source of positive potential (B+), while the collector 36 is connected to a second source of positive potential (B++).

Operation of the device of FIG. 2 is similar to that of FIG. 1, However, the second feedback path containing the capacitor 52 allows the output voltage 56 at the terminal 44 to be also feed back to the junction of the resistor 28 and diode 54. Thus, the potential at the junction of the resistor 28 and diode 54 can rise to a value greater than the value of the first source of positive potential because of the additional voltage being fed back through the capacitor 52. When the voltage at the junction of capacitor 52 and diode 54 rises to a value above that of the first source of positive potential, the diode 54 will act as a switch and cut the first source of positive potential out of the circuit. Also, due to the increased voltage in the circuit caused by the capacitor feedback, the zener diode no longer cuts off, as the sweep voltage can now rise to a value greater than the source of reference potential. Therefore, due to the voltage applied by the feedback capacitor 52, any change in the slope of the sweep voltage caused by the voltage drop across the zener diode will be minimized.

Thus, the modified circuit of FIG. 2 maintains the advantage of FIG. 1 in that the zener diode still allows a a substantially constant charging current through the resistor 26 which is substantially independent of changes in the positive potential. However, the circuit is no longer limited to a maximum sweep voltage as was FIG. 1.

While the invention has been shown utilizing NPN type transistors it will be readily recognized by those skilled in the art that with minor modifications to the circuit PNP, as well as other types of transistors, may be employed in the circuit with the proper polarity applied to the elements without departing from the spirit and scope of this invention.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A sawtooth voltage wave generator for producing sawtooth waveforms of increased linearity comprising:
   a switching transistor having a base, emitter, and collector;
   an output transistor having a base, emitter, and collector and biased for emitter follower operation;
   a charging capacitor connected between said switching transistor collector and emitter;
   means coupling said switching transistor collector to said output transducer base;
   a first diode connected with its anode to a source of voltage;
   first resistor coupled at one side to the cathode of said first diode;
   a second resistor connected between the other side of said first resistor and said switching transient collector;
   a diode means connected between said output transistor emitter and the junction of said first resistor and said second resistor for maintaining a constant current for said charging capacitor; and
   a capacitor connected between said one side of said first resistor and said switching transistor emitter and cooperating with said diode means to provide an increased period of response for said diode means whereby sawtooth waveforms of increased linearity are provided.

2. A sawtooth voltage wave generator in accordance with claim 1 wherein said diode means is a zener diode.

References Cited by the Examiner
UNITED STATES PATENTS
2,998,532  8/1961  Smeltzer _____ 307—88.5

OTHER REFERENCES
Waveforms by Chance et al., published by McGraw-Hill Book Co. (1949), pp. 269–270.

References Cited by the Applicant
UNITED STATES PATENTS
2,957,090  10/1960  Hamilton.
2,965,770  12/1960  Lewinter.
2,983,831  5/1961  Walton.
3,001,086  9/1961  Martinez.
3,031,583  4/1962  Murphy.

ARTHUR GAUSS, *Primary Examiner.*

J. S. HEYMAN, *Assistant Examiner.*